United States Patent
Baker et al.

(10) Patent No.: US 6,230,508 B1
(45) Date of Patent: May 15, 2001

(54) AUTOMOTIVE SECONDARY LOOP AIR CONDITIONING SYSTEM

(75) Inventors: James Allen Baker, Williamsville; Mahmoud Ghodbane, Lockport, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/677,634

(22) Filed: Oct. 3, 2000

Related U.S. Application Data

(60) Provisional application No. 60/203,200, filed on May 11, 2000.

(51) Int. Cl.[7] .................................................. B60H 1/32
(52) U.S. Cl. .................................................. 62/244; 62/434
(58) Field of Search .............................. 62/244, 431, 434, 62/435

(56) References Cited

U.S. PATENT DOCUMENTS

| | | | | |
|---|---|---|---|---|
| 3,675,441 | * | 7/1972 | Perez | 62/431 |
| 4,227,376 | * | 10/1980 | Ishizaki | 62/434 |
| 5,005,386 | * | 4/1991 | MacCracken et al. | 62/431 |
| 5,904,052 | | 5/1999 | Inoue et al. | 62/244 |
| 5,910,157 | | 6/1999 | Noda | 62/133 |

* cited by examiner

*Primary Examiner*—Corrine McDermott
*Assistant Examiner*—Mohammad M. Ali
(74) *Attorney, Agent, or Firm*—Patrick M. Griffin

(57) ABSTRACT

An automotive air conditioning system includes a primary, refrigerant loop (10,12,14) and a low pressure secondary loop (22, 24, 26, 28) across which heat is exchanged by a chiller (16). A liquid coolant reservoir (24, 42) in the secondary loop has a provision to allow the majority of its volume to be incorporated incrementally into the system at start up after the reservoir (24, 42) has sat long enough to become heated, so as not to delay the attainment of a suitable passenger comfort level.

3 Claims, 3 Drawing Sheets

AUTOMOTIVE SECONDARY LOOP AIR CONDITIONING SYSTEM

RELATED APPLICATION

This application claims the benefit of previously filed provisional application Ser. No. 60/203,200 filed May 11, 2000.

TECHNICAL FIELD

This invention relates to automotive air conditioning systems in general, and specifically to a secondary loop system that provides an improved performance.

BACKGROUND OF THE INVENTION

Typical automotive air conditioning systems use the familiar refrigerant cycle system of compressor, condenser, expansion valve and evaporator, through which pressurized refrigerant is continually pumped while the compressor is active. An inherent drawback of the typical system is that it is either on or off. That is, there is no thermal storage or reservoir capacity in such a system that can take over temporarily to maintain passenger comfort when the compressor is turned off for a short time, or which can be activated initially to provide cooling capacity when the system has been shut down for a relatively longer time.

A secondary loop system provides the potential for a reservoir of cooling capacity. In such a system, the conventional refrigerant loop is not used to directly cool the air that is blown into the passenger space. Instead, an intermediate, two fluid heat exchanger, typically known as a chiller, cools a secondary, non pressurized liquid by heat exchange with the cold refrigerant. The cooled secondary liquid is then pumped in a second circuit to one or more air to liquid heat exchangers, over which cooled air is blown into the passenger space. With the non pressurized liquid in the secondary loop, it is feasible to provide a large volume reservoir of "cold", from which cold liquid can continue to be pumped, even when the primary, refrigerant circuit and its compressor is shut down. Such a reservoir is not possible with just a refrigerant loop.

A potential drawback of the secondary loop system is the response of the reservoir after a long period of system shut down, or "soak" as it is sometimes called. Then, the large reservoir of "cold" becomes a large reservoir of "hot" instead, feeding the secondary loop with hot liquid until the whole system can be cooled down. Under those circumstances, the reservoir can actually lengthen the response time and delay passenger comfort.

SUMMARY OF THE INVENTION

The invention provides an improved secondary loop system that maintains the ability of the system to bridge temporary, shorter shut downs of the refrigerant loop, but which avoids the lag problem inherent in a long shut down.

In the embodiment disclosed, a basically conventional primary refrigerant loop provides expanded and "cold" refrigerant, but not directly to an evaporator within the vehicle interior, but rather to one half of a so called "chiller." Within the chiller, an unpressurized, warm secondary liquid is cooled by the cold refrigerant, and pumped through a secondary loop to a liquid to air heat exchanger within the vehicle passenger space. The interior, non pressurized heat exchanger provides cooled air to the passenger space. Within the secondary, pumped liquid loop, a large liquid reservoir is interposed. The reservoir liquid becomes chilled as the system operates and, if the primary, refrigerant loop is temporarily shut down for some reason, can continue to provide cold liquid (and cooled air) to the passenger space.

The reservoir also has novel features that avoid the lag time problem inherent in long periods of shut downs. The reservoir contains a means to temporarily by pass the greatest portion of the reservoir volume when the liquid in the reservoir has become too warm to meet passenger comfort demands. The reservoir is provided with either a smaller volume portion, or a complete by pass, which is initially engaged, so that the entire reservoir volume need not be cooled down at the start. The secondary loop and secondary, interior heat exchanger will reach comfort temperature more quickly than they would if the entire reservoir volume had to be cooled down as well. When a suitable cold temperature is achieved in the by passed secondary loop, the larger portion of reservoir volume is brought on line gradually, so as to not impact passenger comfort, until it, too, has been cooled down to the same degree. Now, the entire volume of the reservoir is sufficiently cooled to provide a "cold reserve."

BRIEF DESCRIPTION OF THE DRAWINGS

These and other features of the invention will appear from the following written description, and from the drawings, in which.

DESCRIPTION OF THE PREFERRED EMBODIMENT

Figure 1:
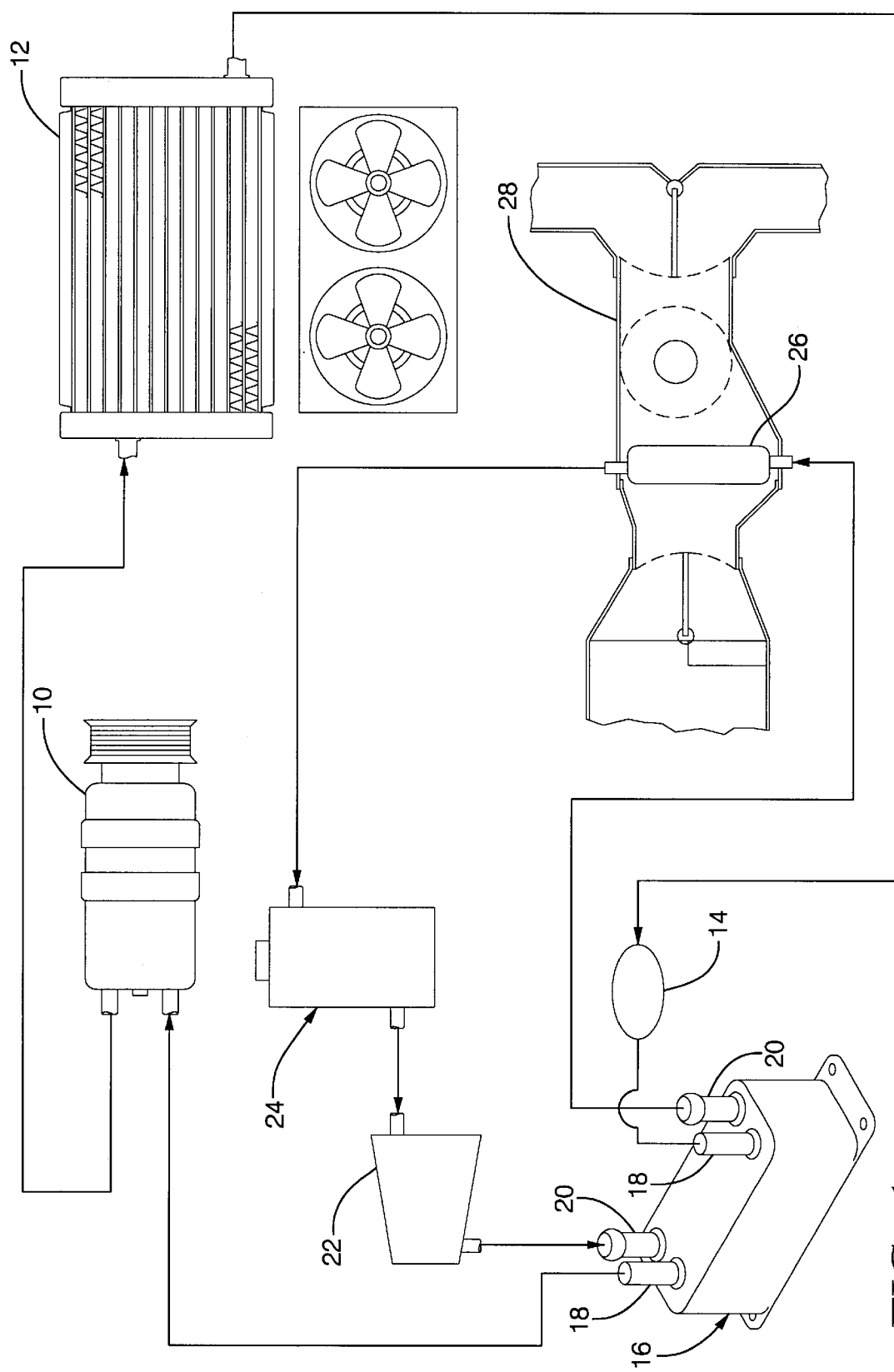
FIG. 1 is a schematic of a secondary loop system in general.

Referring first to FIG. 1, a secondary loop system is generally disclosed and illustrated. The primary loop, described first, includes most of the components found in a conventional system, and operates in similar fashion. The prime mover is a compressor 10, which compresses hot refrigerant vapor and pumps it to a condenser 12, where it is condensed ultimately to a liquid form. The still pressurized liquid refrigerant from condenser 12 is forced through an expansion valve 14, after which, in its expanded, cooled state it enters, not a conventional evaporator, but a "chiller" 16, described in more detail below. In essence, within chiller 16, the cold refrigerant vapor picks up heat, not directly from hot vehicle passenger space air, but from a non pressurized liquid medium. The heated refrigerant vapor continues on to re enter compressor 10 to renew the cycle.

Figure 2:
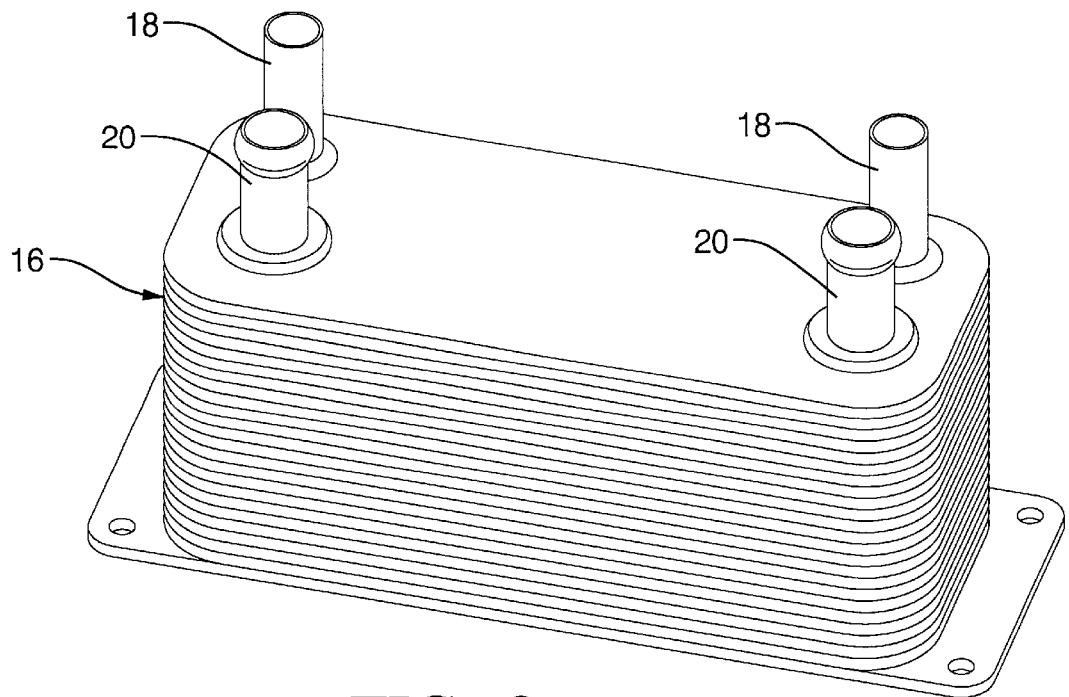
FIG. 2 shows a chiller of the type used in the system.

Referring next to FIGS. 1 and 2, the secondary loop is described in more detail. The heart of the secondary loop is chiller 16, which is a two fluid heat exchanger, made up of an alternating stack of "plates" or flattened flow tubes. Cold, expanded refrigerant is fed to every other tube, through refrigerant inlet/outlets 18. A suitable liquid medium, such as ethylene glycol or water, or a mixture of the two, is pumped under low pressure to every other tube through liquid inlet/outlets 20. In other applications, a heat exchanger like chiller 16 may be used to keep a toxic refrigerant separate from a non toxic liquid, so that the cooled, non toxic liquid may be used to cool food or the like. That is not the concern here, but the separate loops do provide another advantage. The cooled liquid is circulated by a low pressure pump 22 from a reservoir, indicated generally at 24. From reservoir 24, cold liquid is pumped through an air to liquid heat exchanger 26 inside a ventilation module 28 within the vehicle passenger space. Here, hot passenger space air is blown over the interior heat exchanger 26, to be cooled to a suitable passenger comfort level. Interior heat exchanger 26 takes the place of a conventional evaporator, and provides the same function. From interior heat exchanger 26, now warmed liquid coolant re enters reservoir 24 and chiller 16 to be re cooled by the cold refrigerant. The main advantage of the system illustrated is the reservoir 24, which provides a store of cooled liquid that can continue to be pumped to interior heat exchanger 26, even if the compressor 10 in the main loop is shut down. A conventional, single loop air conditioning system has no such "cold reservoir".

Referring again to FIG. 1, the compressor 10 can be a severe drain on vehicle power, especially during acceleration, especially in smaller vehicles with smaller engines. Mileage can be improved if the capability exists for shutting compressor 10 down selectively, without compromising passenger comfort, and the reservoir 24 potentially provides that option. A drawback to the reservoir is that it will, during periods of prolonged shut down, reach hot ambient temperatures and become a "hot sink," increasing the lag time before the secondary loop can reach a suitable passenger comfort temperature threshold.

Figures 3, 4:
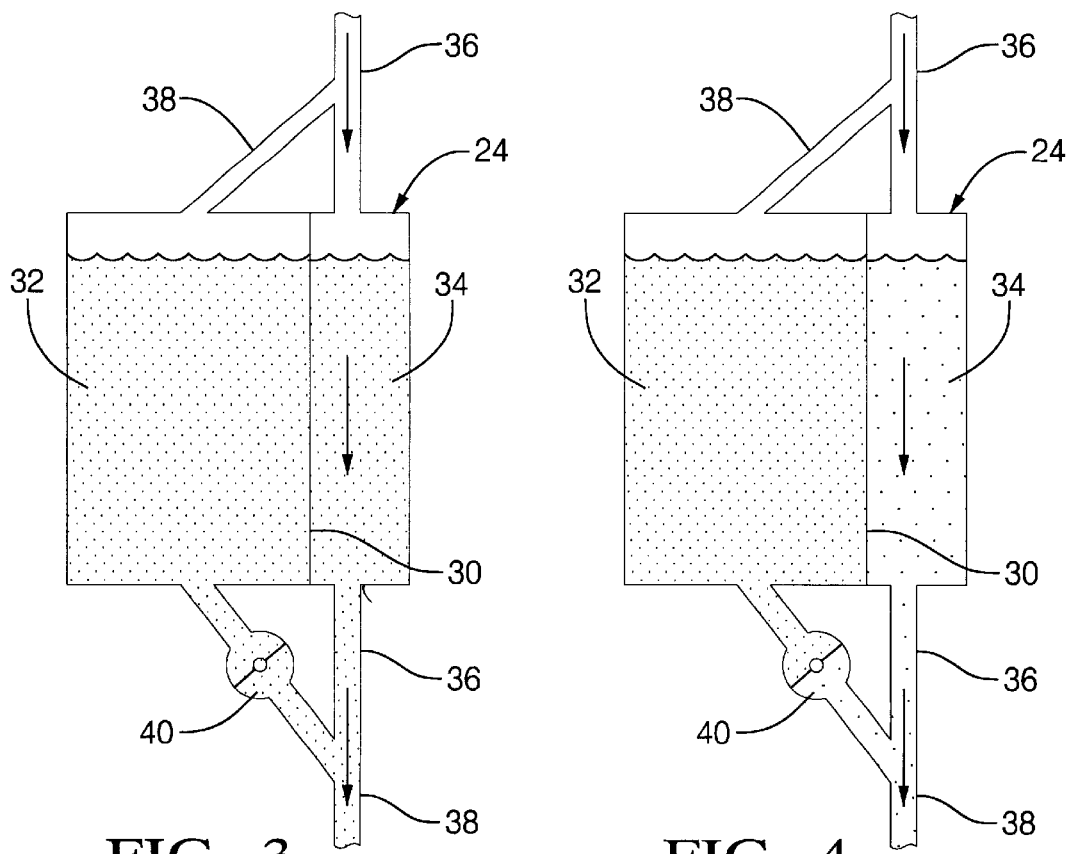
FIG. 3 shows a modified reservoir according to the invention, in its condition following a prolonged shut down.
FIG. 4 shows the reservoir in operation just after start up, with the main volume of the reservoir by passed.

Referring next to FIG. 3, additional features of the invention that avoid this potential drawback are illustrated. Reservoir 24 is divided by an interior wall 30 into a larger, main volume 32 and a smaller volume 34. A by pass line 36 branches off from the main line 38 through smaller volume 34. A proportioning or metering valve 40 interrupts the main line 38 running out of the main reservoir volume 32, upstream of the point where the by pass line 36 re joins the main line 38. Valve 40 includes stepper motor, pulse width modulated solenoid, or other means that allows it to be selectively either completely closed, completely opened, or fractionally opened on command. If valve 40 is completely shut, no flow of liquid medium can run through the main volume 32 at all, and if completely open, flow will run through both main volume 32 and the smaller volume at substantially equal rates. At fractional settings of valve 40, flow will run through the larger volume 32 at varying rates.

Referring next to FIGS. 3 and 4, the operation of reservoir 24 at and just after a start up that follows a prolonged period of shut down is illustrated. Initially, as seen in FIG. 3, both portions of the reservoir 24 are "hot," that is, at a substantially equal ambient temperature, as indicated by the equivalent shading. This is a shut down period generally referred to as a "hot soak," meaning that the system has "soaked up" heat from the environment and essentially reached an equilibrium with it. At start up, the vehicle's control system, sensing the hot condition of reservoir 24, sends a signal to valve 40 to keep it fully shut, sending all liquid flow preferentially through the by pass line 36 and the smaller reservoir volume 34 only. The overall system need only initially cool down this smaller volume of liquid coolant in order for the entire secondary loop (including the interior heat exchanger 26) to reach a suitable passenger comfort temperature. The cold temperature in the smaller volume 34 only is indicated by the differential shading. This initial cool down of the smaller volume 34 will occur much more quickly than if the entire volume of both reservoir portions 32 and 34 had to be cooled down to the same extent. Air blown over the interior heat exchanger 26 will be noticeably cooler sooner to the passengers as well.

Figure 5:
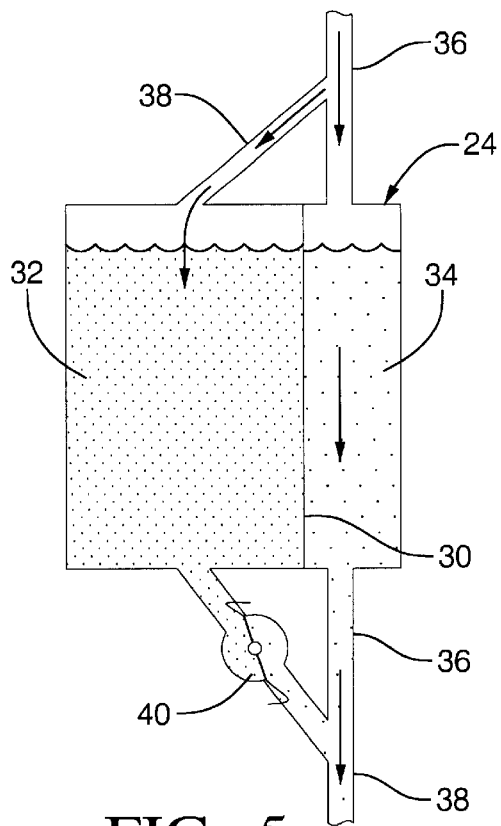
FIG. 5 shows the reservoir later in its operation, when the main volume of the reservoir is being gradually brought on line.
Figure 6:
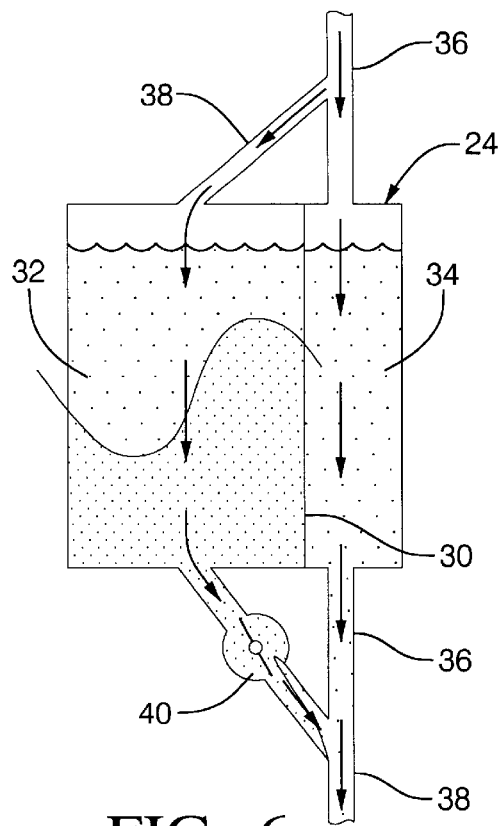
FIG. 6 shows the reservoir later yet in its operation, when the main portion of the reservoir has begun to cool down, and flow through it has been increased.

Referring next to FIGS. 5 and 6, once initial cool down of the smaller reservoir portion 34 has been achieved, the metering valve 40 can be partially opened to start to feed some of the liquid coolant flow into, and through, the larger volume portion 32 and back through the main line 38. This is indicated by the small flow arrows, but the shading indicates that the large volume side of reservoir 24 is still hot. It will, however, begin to gradually cool down as it gradually dumps its accumulated heat into the secondary loop and ultimately through the chiller 16, into the condenser 12, and back to ambient. As the vehicle's control system senses the temperature in the larger volume portion 32 beginning to drop (either through direct sensing, or through passage of some predetermined time), then valve 40 can be opened farther, as indicated by the larger flow arrows in FIG. 6. Valve 40 can be opened farther and farther, either continuously or in pre determined, timed increments, as the cool down process of the larger volume reservoir portion 32 proceeds.

Figure 7:
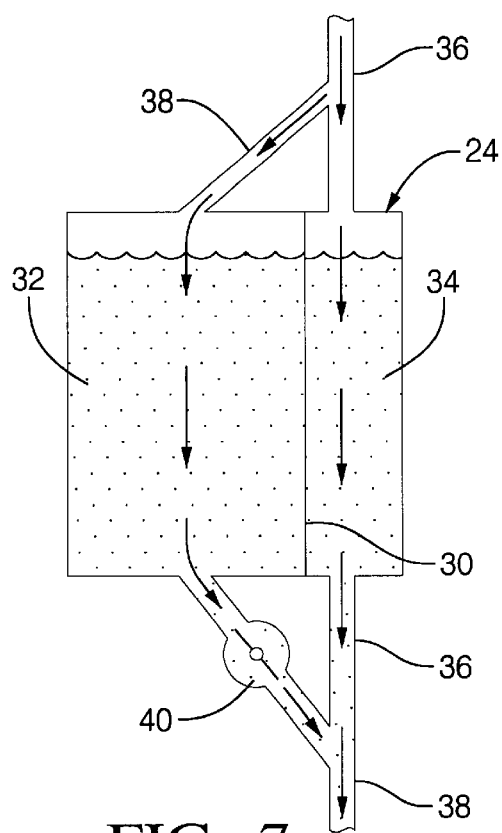
FIG. 7 shows the reservoir in operation after it has been fully cooled, and full flow has been re established through the main volume.

Referring finally to FIG. 7, the larger volume reservoir portion 32 will eventually cool down to match the temperature in the smaller portion 34, and valve 40 can be fully opened. At this point, the two sections of the reservoir 24 effectively act as one large volume, as indicated by the identical shading in the Figure. Then, during temporary shut downs of compressor 10, when a conventional, single loop system would have no "cold reservoir" to tap, the pump 22 can continue to provide cold liquid medium, from reservoir 24, to the interior heat exchanger 26. As noted above, this gives the potential for the vehicle controller to selectively turn compressor 10 off during peak power usage events without unduly compromising passenger comfort. The system could respond equally well to prolonged periods of compressor shut down while the vehicle was operating. That is, if the reservoir 24 became as warm as it would during a prolonged soak period, the same process of by pass and gradual pull down of the larger reservoir volume 32 could be started.

Figure 8:
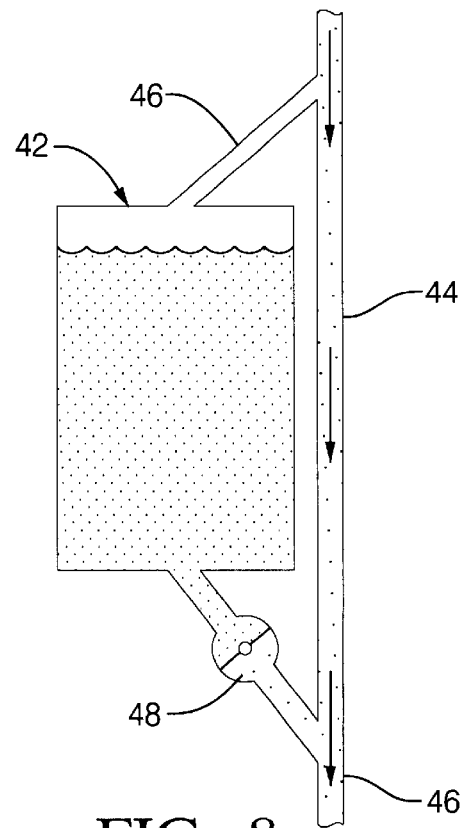
FIG. 8 shows an alternate embodiment to the reservoir configuration.

FIG. 8 shows a potential alternate embodiment of the reservoir 24, indicated generally at 42. Instead of a bifurcated volume per se, the reservoir 42 is by passed completely by a by pass line 44 that branches off from the main line 46 running through the reservoir 42. A similar metering valve 48 selectively blocks the main line 46, and proportionately by passes flow from and around the entire reservoir 42, to achieve the same result. In effect, the alternate embodiment represents the case where the smaller reservoir volume 34 becomes as small as the volume of the by pass line itself.

Variations in the disclosed embodiment could be made. Multiple interior heat exchangers 26 and reservoirs like 24 could be incorporated, to accommodate discrete, separate sections of a vehicle interior space. More than one discrete section of the reservoir could be defined which would be selectively opened up to the secondary loop as the system progressively cooled down after a long soak. Therefore, it will be understood that it is not intended to limit the invention to just the embodiment disclosed.

What is claimed is:

1. In an automotive air conditioning system having a primary refrigerant loop (10,12,14) through which pressurized refrigerant is circulated and a secondary loop (22, 26) through which low pressure liquid coolant is circulated to cool a vehicle passenger space to a predetermined passenger comfort level, with heat being transferred from said liquid coolant to said refrigerant across a chiller (16) characterized in that, said secondary loop (22, 26) also contains a reservoir (24, 42) for liquid coolant, which reservoir (24, 42) includes a means (32, 34, 36, 40 and 44, 48) to temporarily by pass the majority of the volume of said reservoir, whereby, when the coolant in said reservoir is heated substantially above said passenger comfort level, less than the full volume of the coolant in said reservoir can be initially incorporated into the secondary loop, thereby reducing the time for the passenger comfort level to be attained.

2. An automotive air conditioning system according to claim 1, further characterised in that said temporary by pass means includes a metering valve (40, 48) that is capable of incrementally incorporating the temporarily by passed majority of the volume of said reservoir (24, 42) over time into the secondary loop (22, 26).

3. An air conditioning system according to claim 2, further characterised in that said reservoir (24) is divided into a discrete larger volume portion (32) that is initially by passed, and a smaller volume portion (34) that is not initially by passed.

\* \* \* \* \*